United States Patent [19]

Cesar

[11] Patent Number: 4,968,553
[45] Date of Patent: Nov. 6, 1990

[54] GRAPHIC ARCHITECTURAL GLASS

[76] Inventor: Claudio Cesar, 459 Lurgan Rd., New Hope, Pa. 18938

[21] Appl. No.: 245,338

[22] Filed: Sep. 16, 1988

[51] Int. Cl.⁵ .................... B32B 17/10; B32B 27/40
[52] U.S. Cl. ........................... 428/203; 428/412; 428/426; 428/210; 428/425.6; 428/423.1
[58] Field of Search ............ 428/412, 426, 203, 210, 428/425.6, 423.1; 156/326

[56] References Cited

U.S. PATENT DOCUMENTS

| | | | |
|---|---|---|---|
| 3,509,015 | 4/1970 | Wismer et al. | 161/190 |
| 3,973,058 | 8/1976 | Grover et al. | 427/163 |
| 4,010,311 | 3/1977 | Lewis et al. | 428/424 |
| 4,364,786 | 12/1982 | Smith, Jr. et al. | 156/99 |
| 4,555,414 | 11/1985 | Hoover et al. | 427/43.1 |
| 4,642,959 | 2/1987 | Swiech, Jr. et al. | 52/311 |
| 4,822,680 | 3/1989 | Catalano et al. | 428/425.6 |

Primary Examiner—George F. Lesmes
Assistant Examiner—Elizabeth M. Cole
Attorney, Agent, or Firm—Gregory J. Gore

[57] ABSTRACT

A graphic glass laminate is created by heat-laminating a printed sheet of extruded polyurethane between two plates of glass, using normal autoclave process. The polyurethane interlayer bonds directly to the glass with very little distortion to the color or registration of the printed ink. The resulting composite is extremely strong and safe, having better structural and superior heat-resistant characteristics compared to regular safety glass and may contain an extremely artistic and decorative look. The interlayer graphics can be made "light-fast" when proper inks are used. Transparent and translucent inks may be employed and the glass may be used with different lighting techniques, such as edge-lighting.

11 Claims, 1 Drawing Sheet

FIG. 1
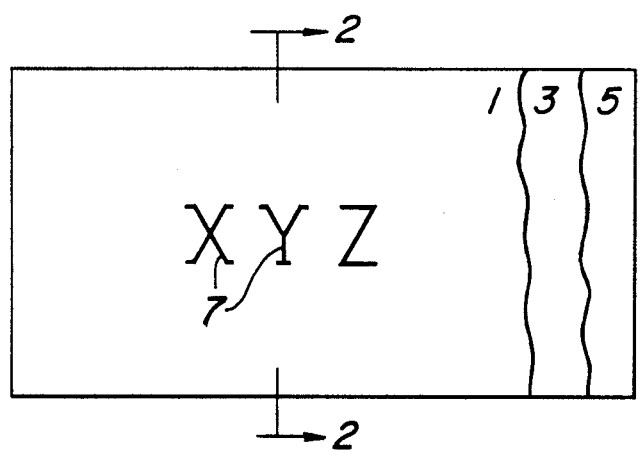
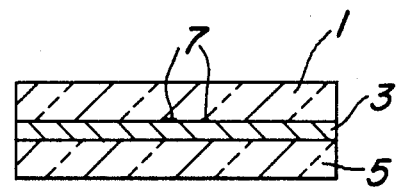
FIG. 2

GRAPHIC ARCHITECTURAL GLASS

FIELD OF THE INVENTION

The present composition and method pertains to laminated architectural glass. More specifically, it pertains to laminated architectural glass having a decorative interlayer.

BACKGROUND OF THE INVENTION AND DESCRIPTION OF THE PRIOR ART

Laminated glass is most commonly found in automotive windshields and architectural building glass. Two outer sheets of glass are vulcanized to an interlayer, usually composed of polyvinyl butyral. Polyvinyl butyral is commonly used as an interlayer for safety glass and is used in sheet form, heat-laminated between glass sheets under pressure. However, polyvinyl butyral (PVB) compounds are very sensitive to warm temperatures, humidity, and most solvents prior to lamination, so that using them with any combination of paint or ink directly applied is almost impossible.

There has been very little use of decorative interlayer materials in order to create architectural glass graphics for applications, such as windows and signage. Printing directly onto the glass and then laminating with PVB is a method currently used, however, it is cumbersome and ineffective because the interlayer is laminating to the ink film and not bonding directly to the glass in areas where the paint or ink covers the PVB interlayer. This method, therefore, works only when small areas of glass are used for a graphic display. Another method used to create glass graphics is the vinyl-stencil method. Cut-out vinyls are first adhered to the glass and then laminated with PVB. There is some success with this process, however, it is very costly and time-consuming and there is a very high failure rate with large surface areas covered by the graphic. Also, most polyvinyl stenciling materials are not light-fast.

It is known to replace the polyvinyl butyral interlayer with a composition of polyurethane as taught in U.S. Pat. No. 3,509,015. In this instance, the polyurethane interlayer is cast in place from a pourable resin. Decorative effects may be obtained by coloring the resin prior to lamination.

U.S. Pat. No. 3,640,798 discloses a method of applying a colored self-vulcanizing paste onto a cellular foam plastic interlayer, which is then mechanically sandwiched between two pieces of glass. The paste must be hand applied with a knife, or be applied by stamping or molding processes, applied directly to the cellular foam plastic interlayer. This construction limits the mass production possibilities.

As outlined above, the various processes which have been used to create a graphic or color image sealed between layers of glass require heavy or large machinery and, in some cases, very expensive die-cutting materials. Most of the processes must be maintained in temperature and humidity-controlled environments which are required for handling the polyvinyl butyral materials. In addition, only small areas where the graphic covers the glass are possible, the coloring materials are not light-fast and a very high failure rate usually occurs. Where the materials are not molecularly fused (heat-laminated), the composite is often not permanent.

No one before has been able to achieve mass production printing on a transparent interlayer fused by heat lamination between sheets of glass to yield a unitary, permanent, graphic panel.

SUMMARY OF THE INVENTION

To overcome the problems in the prior art described above, a decorative laminated glass has been devised from the composition and method as follows. It has been found that mass production printing processes, such as automated silk screening, can be used to apply non-solvent-based inks directly on sheet polyurethane. Sheet polyurethane is extremely easy to handle and will accept a wide variety of inks. Because of this ease of handling, printing of inks on the polyurethane interlayer can be separated from the laminating process, both in time and distance. The printed polyurethane sheets can easily be rolled up for storage or shipment to the glass production site. These factors make the instant process both convenient and inexpensive, since handling and transporting the glass components is kept to a minimum.

The printed polyurethane interlayer is then heat-laminated between two pieces of glass using standard autoclave laminating procedures without the use of adhesives. The polyurethane interlayer bonds directly to the glass with very little distortion to the color or registration of the printed ink. The resulting composite is extremely strong and safe, having better structural and superior heat resistance characteristics compared to polyvinyl butyral safety glass, and may also contain an extremely artistic and decorative look. Furthermore, the interlayer graphics can be made "light-fast" when proper inks are used. Transparent and translucent inks may be employed so that the glass may be used with different lighting techniques, such as edge-lighting. The results are both permanent, inexpensive, and visually unique.

It is important that the ink or paint be chemically compatible and self-adhesive to the urethane sheet material. It may be applied by brushing, spraying or printing to the extruded urethane interlayer. The paint or ink film may be dried by air, or force-dried by ultraviolet light using light-cured ink. The urethane interlayer may be placed between glass or polycarbonate, or a combination of both.

A variety of uses are possible for this new graphic glass. For instance, one color may be applied to create a graphic effect to resemble sandblasting or etching. Also, by using a four-color process, a photographic effect can be achieved that can be viewed from either side of the glass. Finally, the polyurethane interlayer can be used in combination with photosensitive or electrically-conductive materials, inks, or resins.

In yet another embodiment, a light-reacting material, such as phosphorous, interference pigments or any light-reacting material, can be ground or blended in a transparent workable vehicle that is applied to the urethane sheet. In this embodiment, the laminate would appear transparent; but, when exposed to various lights by either edge-lighting or placing a light at certain angles, it would react to the material and a graphic image would appear on the interlayer substrate. Other adaptations and modifications will be readily apparent to those of ordinary skill in the art from the following drawings and description of the preferred embodiment.

BRIEF DESCRIPTION OF THE DRAWINGS

FIG. 1 is a front view of applicant's invention having indicia denoting "X Y Z".

FIG. 2 is a side sectional view showing the three-layer construction of the present invention.

BRIEF DESCRIPTION OF THE PREFERRED EMBODIMENT

Referring now to FIG. 1, the letters "X Y Z" are shown printed on a urethane interlayer between two sheets of glass. Top sheet 1 is transparent, the indicia 7 are printed on interlayer 3 which is likewise a transparent sheet. The rear plate 5 is a second sheet of transparent glass. In this embodiment, the letters X Y Z appear to be floating in a transparent background. The interlayer 3 is sheet polyurethane of the type supplied by KSH, Inc., of 10091 Manchester Road, St. Louis, Mo. It is sold under the name "THERMAL PLASTIC ALIPHATIC POLYETHER URETHANE". FIG. 2 shows the simple three-layer sandwich lamination of glass sheets 1 and 5 with interlayer 3 located therebetween.

The production of the present invention is a simple, two-step process. First, graphics are applied to sheet urethane by directly printing thereon using mass production techniques, such as silkscreening, and then the urethane is bonded to the glass plates through the standard glass-laminating autoclave process. The surprising discovery of this invention is that the printed substrate maintains its quality and registration throughout the autoclave process and does not inhibit the quality of the lamination between the urethane and the glass. Various inks can be used but must be non-solvent-based so that there is no chemical reaction with the urethane. Polymer inks and polyvinyls that adhere to urethane are possible choices. Also, "solid inks", such as UV-drying inks and various other inks that do not use solvents such as THF or DMF keytones, should also work well.

An important characteristic of the ink is that it adheres well to the urethane without reacting to it. It is also necessary that the ink be very flexible so that it will not crack when the sheet urethane is wound into a roll for storage or transportation. Also, the film thickness of the ink should be kept to a minimum so there is a seepage effect of the urethane through the ink during the laminating process. This is a key factor and permits molecular bonding between the ink, urethane and the glass. It has been found that using this process, the urethane sheet and ink combination adhere directly to the glass without distortion or loss of quality of the printed graphic.

As explained above, sheet urethane is extremely easy to handle and laminates well with glass, even when used in very large areas. Contrary to the laminating process using PVB, which requires large or heavy machinery and expensive die-cutting materials, the present process does not have to be maintained in a temperature and humidity-controlled environment. This ease of handling permits large pieces of graphic glass to be manufactured very inexpensively. Printing may be applied to the sheet urethane with standard silkscreen process and the urethane may be fed into the printing presses in roll form or in cut sheets.

The printing may be to apply lettering or other graphics for various effects. For instance, a single off-white color can be applied to create the graphic effect of sandblasting or etching. A four-color process using standard four-color inks (yellow, magenta, cyan and black) can be used to create any tones or shades of color. Furthermore, by using transparent inks, one is able to create different hue effects by printing one ink over another. In yet another embodiment contemplated by this invention, the ink may include materials such as phosphorus, interference pigments of any light-reacting material that can be ground and blended into a transparent, workable material that can be printed or applied to the urethane. This last embodiment may be used in combination with various lighting techniques, such as edge-lighting.

The advantages of the present invention are as follows: (a) printing directly on the urethane and then laminating the urethane between two sheets of glass is a simple, two-step method; (b) the glass laminate then becomes safety glass and suitable for architectural use because of its strength and non-shatter qualities; (c) light-fast inks can be used and, hence, the quality of the printing on the urethane will not degrade over time; (d) the use of urethane permits the laminate to withstand temperatures up to 300 degrees Fahrenheit; and, (e) the urethane and the graphic create a molecular bond to the glass so that there is no chance of the graphic becoming separated from the glass, creating bubbles or pockets of air in the laminate.

The various uses for the present invention are only limited by the imagination of the designer. However, it is contemplated that this invention will be particularly useful in: architectural glazing and spandrels, signage, doorways and interior enclosures, wall finishes, tables and furnishings, waterproof interior partitions, bus shelter and exterior partitions, and packaging and other manufactured articles.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An architectural glass laminate, comprising:
  a. two sheets of rigid, transparent material,
  b. an interlayer sheet of extruded polyurethane, heat-laminated between said sheets of rigid material, and
  c. non-solvent based ink containing solid pigments printed on said polyurethane interlayer, prior to lamination, to provide a permanent graphic panel of unitary construction.

2. The architectural glass laminate of claim 1 wherein one or more of said sheets are composed of a polycarbonate.

3. The architectural glass laminate of claim 1 wherein said ink is UV-drying ink.

4. The architectural glass laminate of claim 3 wherein said ink is printed using silk-screen contact printing.

5. The architectural glass laminate of claim 4 wherein said ink is printed sequentially in four printing steps using four different colors.

6. The architectural glass laminate of claim 1 wherein said transparent rigid sheets are glass.

7. The architectural glass laminate of claim 6 wherein said extruded polyurethane is in flexible sheet form.

8. The architectural glass laminate of claim 7, wherein said inks are polyvinyls, which are light-fast and are applied in a very thin layer to said polyurethane sheet.

9. The architectural glass laminate of claim 8 wherein said ink further includes a light-reacting material and said lamination being in combination with edge-lighting.

10. The architectural glass laminate of claim 9 wherein said ink is electrically conductive.

11. An architectural glass laminate, consisting of:
a. two sheets of rigid, transparent material,
b. an interlayer sheet of extruded polyurethane, heat-laminated between said sheets of rigid material, and
c. ink containing solid pigments printed on said polyurethane sheet, prior to lamination, to provide a permanent graphic panel of unitary construction.

* * * * *